United States Patent
Weickenmeier et al.

[11] Patent Number: 6,149,108
[45] Date of Patent: Nov. 21, 2000

[54] CABLE RETAINER

[75] Inventors: Klaus Weickenmeier, Ettlingen; Juergen Perstel, Betzigau, both of Germany

[73] Assignee: Robert Bosch GmbH, Stuttgart, Germany

[21] Appl. No.: 09/297,639

[22] PCT Filed: Jul. 17, 1998

[86] PCT No.: PCT/DE98/02004

§ 371 Date: Jun. 18, 1999

§ 102(e) Date: Jun. 18, 1999

[87] PCT Pub. No.: WO99/13255

PCT Pub. Date: Mar. 18, 1999

[30] Foreign Application Priority Data

Sep. 6, 1997 [DE] Germany .......................... 197 39 151

[51] Int. Cl.[7] ..................................................... F16L 3/12
[52] U.S. Cl. .......................................................... 248/74.1
[58] Field of Search ................................. 248/74.1, 74.2, 248/74.3, 73; 24/563, 487, 336, 297

[56] References Cited

U.S. PATENT DOCUMENTS

| | | | |
|---|---|---|---|
| 2,108,347 | 2/1938 | Quarnstrom | 248/73 |
| 4,369,946 | 1/1983 | Palmer et al. | 248/74.1 |
| 5,639,049 | 6/1997 | Jennings et al. | 248/74.2 |

*Primary Examiner*—Ramon O. Ramirez
*Attorney, Agent, or Firm*—Ronald E. Greigg; Edwin E. Greigg

[57] ABSTRACT

A cable retainer which is made of plastic including elastic element which can be bent to secure a cable in place. The cable retainer has a retaining element with a curved end wall and a retaining tongue with a free end that is aligned with the retaining element. On both sides of the retaining tongue guide rails are provided, which with an inclined portion of their guide face guides the cable during cable installation and prevents excessive sagging of the retaining tongue in order to secure the cable between the curved end wall and the retaining tongue. The cable retainer either as an independent part or as an integral part of a body serves to fix a cable to a body.

5 Claims, 1 Drawing Sheet

CABLE RETAINER

PRIOR ART

The invention is based on a cable retainer. A cable retainer is already known (German Patent Disclosure DE 24 40 201 A1) that is integrated into the casing of a cooling fan of an internal combustion engine, but there is a risk that the cable retainer will break off when the cable is installed or removed, since for reasons of strength a relatively inelastic plastic is used for the casing.

ADVANTAGES OF THE INVENTION

The cable retainer according to the invention, has the advantage over the prior art of being simple in construction, allowing easy installation and removal of the cable with little risk of breakage of the cable retainer. To install or remove the cable, the retaining tongue need merely be bent slightly, while in the installed state of the cable bending forces no longer act on the retaining tongue; only pressure forces act on the end face of the free end, so that a secure hold of the cable is assured even if vibrational stresses occur.

Advantageous refinements of and improvement to the cable retainer defined by the main claim are possible by means of the provisions recited hereinafter.

It is especially advantageous, for the retaining tongue provided with a bottom face oriented toward a body, a top face remote from the body and side faces, to provide a guide rail next to each side face of the retaining tongue; the guide rail has a guide face with a portion that is at least partly inclined relative to the top face and that at least in the direction toward the free end of the retaining tongue extends with a less spacing from the body than the bottom face of the retaining tongue. During installation and removal of the cable, the guide faces of the guide rail prevent the retaining tongue from being bent past its limit of elasticity and breaking.

It is also advantageous to make the cable retainer of plastic and to embody it as an integral part of the body.

BRIEF DESCRIPTION OF THE DRAWING

One exemplary embodiment of the invention is shown in simplified form in the drawing and described in further detail in the ensuing description.

DESCRIPTION OF THE EXEMPLARY EMBODIMENT

Figure 1:
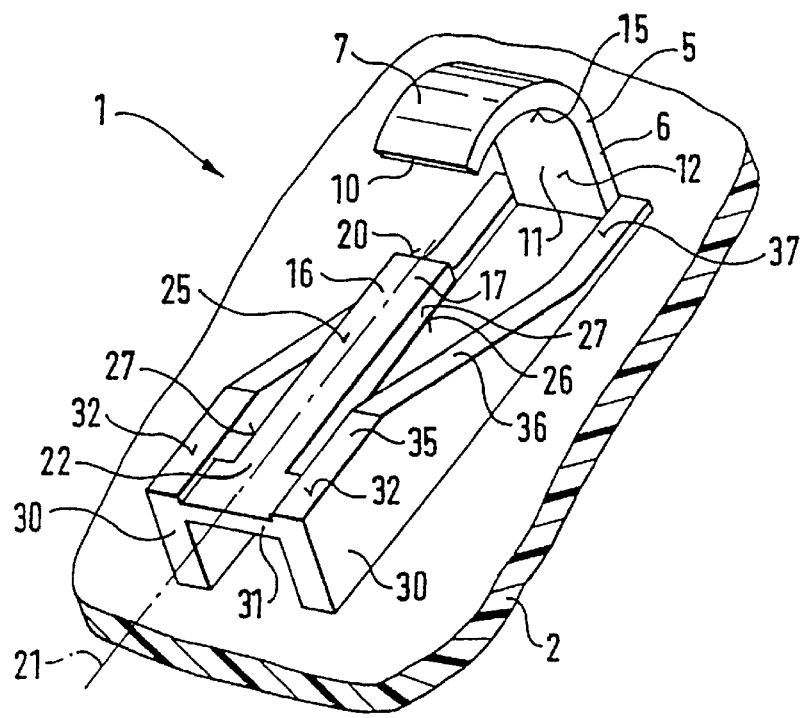
FIG. 1 shows a three-dimensional view of the cable retainer of the invention.
Figure 2:
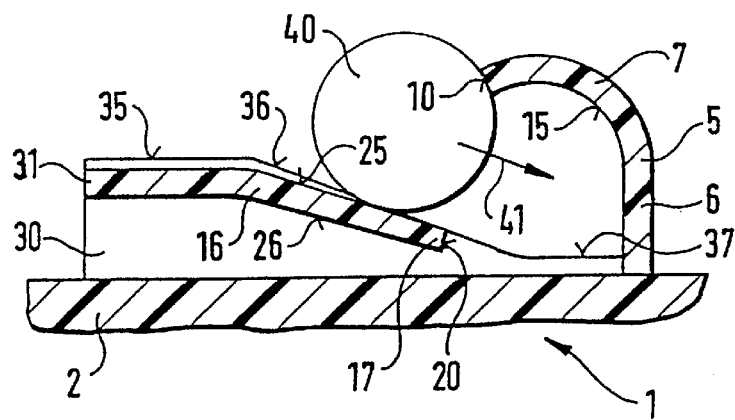
FIG. 2 is a section through the cable retainer of FIG. 1 during the installation of a cable.
Figure 3:
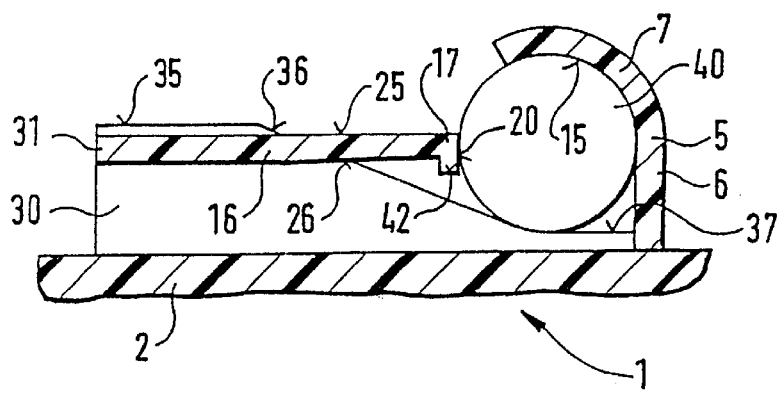
FIG. 3 is a section through the cable retainer of FIG. 1 with a cable installed.

In FIGS. 1–3, a cable retainer 1 is shown which either is embodied as an independent component or is an integral part of a body 2, which is formed for instance by the casing of a cooling fan for internal combustion engines, as shown in DE 24 40 201 A1, which is hereby expressly incorporated by reference in this respect. If the cable retainer 1 and the body 2 are separate components, then they are joined together in a manner not shown, such as by adhesive bonding, soldering, welding, or by screw fastening. The cable retainer 1 and the body 2 may be of different materials. If the cable retainer 1 is an integral component of the body 2, then plastic is used as the material for it.

The cable retainer 1 has a retaining element 5, which has a rectangular cross section, for instance, and which, beginning at the body 2, has a vertical flat wall 6 extending away from the body and adjoining the flat wall (6) a curved wall 7, which extends circularly for instance and describes at least a quarter-circle. In the exemplary embodiment shown, the curved wall 7 extends over approximately 120° and ends at a free wall end 10, which in the exemplary embodiment shown is inclined toward the body 2. An inner wall 11 of the retaining element 5 has a flat portion 12 in the region of the flat wall 6, and a curved portion 15 in the vicinity of the curved wall 7.

The cable retainer 1 also has a spring-elastic retaining tongue 16, whose free end 17 is aimed with its end face 20 toward the retaining element 5. The retaining tongue 16 has a rectangular cross section and extends along a longitudinal axis 21 from a fixed tongue end 22 to the free tongue end 17 with a top face 25 remote from the body 2, a bottom face 26 oriented toward the body 2, and two side faces 27 extending crosswise between the top face 25 and bottom face 26. Extending next to each side face 27 and spaced laterally apart from it is a guide rail 30. The guide rails 30 are joined together, remote from the retaining element 5, by a yoke 31. With the vertical spacing, in terms of the drawing, from the body 2, the fixed tongue end 22 is joined to the yoke 31, so that beginning at the fixed tongue end 22, the retaining tongue 16 can be bent in the vertical direction between the guide rails 30 with a vertical spacing from the body 2. Each of the guide rails 30 has an inner wall guide face 30', remote from the body 2, which beginning at the yoke 31 has a parallel upper portion 35 that is parallel to the top face 25 of the retaining tongue 15, and adjoining that a portion 36 which is inclined relative to the top face 25 of the retaining tongue 16; this portion 36 extends toward the flat wall 6 of the retaining element 5 with a lesser spacing from the body 2 than the bottom face 26 of the retaining tongue 16 does. In the exemplary embodiment shown, the guide face 32, adjoining the inclined portion 36, changes into a bearing portion 37, which extends parallel to the top face 25 of the retaining tongue 16 as far as the retaining element 5 and has an only slight vertical spacing from the body 2 compared with the parallel portion 35. In an embodiment not shown here, the bearing portion 37 may also be omitted, so that the inclined portion 36 of each guide rail 30 extends as far as the body 2. The yoke 31 and the top face 25 of the retaining tongue 16 extend vertically upward with a spacing from the body 2 that is less by a few tenths than do the parallel portions 35 of the guide rails 30. The inclined portion 36 of the guide face 32 of each guide rail 30 begins approximately in the vicinity of the fixed tongue end 22, which is equivalent to approximately one-third to one-half the length of the retaining tongue 16 in the direction of the longitudinal axis 21. The vertical spacing between the bearing portion 37 of the guide face 32 of each guide rail 30, or the body, and the vertically highest point of the curved portion 15 of the inner wall 11 of the retaining element 5 is approximately equivalent to the diameter of the cable 40.

In FIG. 2, the cable retainer 1 is shown during cable installation, in which the cable 40 is located parallel to the inclined portion 36 of the guide rails 30 and thus causes the retaining tongue 16 to sag toward the body 2. Upon a further displacement of the cable 40 in the direction of the arrow 41, the cable 40 snaps under the also elastically yielding curved wall 7 of the retaining element 5 and assumes the position shown in FIG. 3, in which the cable is grasped by a large part of the way around by the retaining element 5, and the retaining tongue 16, bends back into its outset position, the tongue 16 is aimed with its end face 20 approximately at the center point of the circular cable cross section. The retaining tongue 16 blocks off the removal of the cable 40 from the cable retainer 1. Only if the retaining tongue 16 is again, intentionally, bent away toward the body 2 is it possible to remove the cable 40 from the cable retainer 1. In FIG. 3, a tongue extension 42, extending crosswise to the top face 25 and bottom face 26, is formed on the free tongue end 17, thus making for a larger end face 20 facing the cable 40 in the installed state shown in FIG. 3.

The foregoing relates to preferred exemplary embodiments of the invention, it being understood that other variants and embodiments thereof are possible within the spirit and scope of the invention, the latter being defined by the appended claims.

What is claimed is:

1. A cable retainer for fixation of a cable to a body, comprising a spring-elastic retaining tongue (16) and having a retaining element, toward which the retaining tongue is oriented along a longitudinal axis (21) with a free tongue end, along the longitudinal axis (21) the retaining tongue (16) has a top face (25) and a bottom face (26) which lie opposite to each other, said free tongue end (17) has an end face (20) extending crosswise to the top face (25) and the bottom face (26) the retaining element (5) has an inner wall (11) with a curved position (15) for grasping the cable (40) partway around its circumference and the end face (20) of the free end (17) of the retaining tongue (16) opposite the inner wall (11) of the retaining element (5) is perpendicular to a circumference of the cable (40).

2. The cable retainer according to claim 1, in which a tongue extension (42), extending crosswise to the top face (25) and the bottom face (26), is formed on the free tongue end (17) and the end face (20) of the free tongue end (17) of the retaining tongue (16) is embodied at the tongue extension (42).

3. A cable retainer for fixation of a cable to a body, comprising a spring-elastic retaining tongue oriented along a longitudinal axis (21), said spring-elastic retaining tongue including a free tongue end (17) directed along the longitudinal axis toward a retaining element (5), the retaining tongue (16) extends from a fixed tongue end (22) joined to the body (2) to said free tongue end (17) along the longitudinal axis (21), the fixed tongue includes a bottom face (26) oriented toward the body (2), a top face (25) remote from the body (2), and two side faces (27) that extend crosswise between the top face (25) and the bottom face (26), said retaining element (5) including a curved inner wall (11, 15) for grasping a cable (40) partway around a circumference of the cable, between said spring-elastic tongue and said retaining element (5), a guide rail (30) is joined to the body (2) adjacent each side face (27) of said spring-elastic retaining tongue, each said guide rail has a guide face (32) and a portion (36) extending from said guide face inclined relative to the top face (25) of the retaining tongue (16) so that the portion (36) extends, at least in a direction toward the free tongue end (17), with a lesser spacing from the body (2) than does the bottom face (26) of the retaining tongue (16) whereby the cable is secured between said spring-elastic retaining element, the included portion (36) and the curved inner wall of the retaining element.

4. The cable retainer according to claim 3, in which the cable retainer (1) is made of plastic.

5. The cable retainer according to claim 4, in which the cable retainer (1) is an integral part of the body (2).

* * * * *